(12) United States Patent
Jia et al.

(10) Patent No.: US 11,924,298 B2
(45) Date of Patent: Mar. 5, 2024

(54) MESSAGE PUSHING METHOD FOR A VIRTUAL GIFT AND ELECTRONIC DEVICE

(71) Applicant: BEIJING BYTEDANCE NETWORK TECHNOLOGY CO., LTD., Beijing (CN)

(72) Inventors: Shihao Jia, Beijing (CN); Wei Zhang, Beijing (CN); Zhengyao Guo, Beijing (CN); Qi Zhang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 51 days.

(21) Appl. No.: 17/609,733

(22) PCT Filed: Apr. 28, 2020

(86) PCT No.: PCT/CN2020/087396
§ 371 (c)(1),
(2) Date: Nov. 8, 2021

(87) PCT Pub. No.: WO2020/224482
PCT Pub. Date: Nov. 12, 2020

(65) Prior Publication Data
US 2022/0239760 A1 Jul. 28, 2022

(30) Foreign Application Priority Data
May 8, 2019 (CN) .......................... 201910380362.0

(51) Int. Cl.
*G06F 15/16* (2006.01)
*H04L 67/306* (2022.01)
*H04L 67/55* (2022.01)

(52) U.S. Cl.
CPC ............ *H04L 67/55* (2022.05); *H04L 67/306* (2013.01)

(58) Field of Classification Search
CPC .............................. H04L 67/55; H04L 67/306
(Continued)

(56) References Cited

U.S. PATENT DOCUMENTS

| 8,700,714 | B1 * | 4/2014 | Pan ........................ H04L 65/60 |
| | | | 709/206 |
| 10,821,357 | B1 * | 11/2020 | Rotelli .................. H04L 67/141 |

(Continued)

FOREIGN PATENT DOCUMENTS

| CN | 104994421 A | 10/2015 |
| CN | 105406974 A | 3/2016 |

(Continued)

OTHER PUBLICATIONS

International Search Report in International Patent Application No. PCT/CN2020/087396, completed Jul. 8, 2020, with English translation (6 pages).

(Continued)

*Primary Examiner* — Alan S Chou

(57) ABSTRACT

Embodiments of the present disclosure provide a message pushing method for a virtual gift and an electronic device. The method includes: when a virtual gift is received in a live broadcast room, determining a live broadcast room area to which a notification message is pushed, where the notification message is used to inform all live broadcast rooms in the live broadcast room area that the virtual gift is received; and pushing the notification message to the live broadcast room in the live broadcast room area respectively. The embodiments of the present disclosure implement rich methods for posting notification information about the receipt of the virtual gift, thereby improving user experience.

18 Claims, 1 Drawing Sheet

(58) Field of Classification Search
USPC .......................................................... 709/219
See application file for complete search history.

(56) References Cited

U.S. PATENT DOCUMENTS

| | | | | |
|---|---|---|---|---|
| 11,146,599 | B1* | 10/2021 | Jackson | .............. H04L 65/1101 |
| 2014/0214986 | A1* | 7/2014 | Hwang | .............. H04L 12/1822 |
| | | | | 709/206 |
| 2014/0279408 | A1* | 9/2014 | Bowles | .................. G06Q 20/28 |
| | | | | 705/39 |
| 2014/0372188 | A1 | 12/2014 | Desideri | |
| 2017/0064399 | A1* | 3/2017 | Jabara | .................... H04L 51/224 |
| 2020/0099960 | A1* | 3/2020 | Yu | ........................... A63F 13/86 |

FOREIGN PATENT DOCUMENTS

| | | |
|---|---|---|
| CN | 105976215 A | 9/2016 |
| CN | 106973319 A | 7/2017 |
| CN | 107547947 A | 1/2018 |
| CN | 108156507 A | 6/2018 |
| CN | 108966034 A | 12/2018 |
| CN | 109194973 A | 1/2019 |
| CN | 110300335 A | 10/2019 |
| KR | 101895001 B1 | 9/2018 |

OTHER PUBLICATIONS

Office Action in Chinese Patent Application No. 201910380362.0, dated Dec. 23, 2020 (6 pages).
Notice of Allowance in Chinese Patent Application No. 201910380362.0, dated Jul. 21, 2021 (1 page).

* cited by examiner

MESSAGE PUSHING METHOD FOR A VIRTUAL GIFT AND ELECTRONIC DEVICE

CROSS-REFERENCE TO RELATED APPLICATIONS

This application is a National Stage of International Application No. PCT/CN2020/087396, filed on Apr. 28, 2020, which claims priority to Chinese patent application No. 201910380362.0 titled "MESSAGE PUSHING METHOD FOR A VIRTUAL GIFT AND ELECTRONIC DEVICE" filed with the China National Intellectual Property Administration on May 8, 2019. Both of the above applications are incorporated herein by reference in their entireties.

TECHNICAL FIELD

The present disclosure relates to the field of Internet technology, and in particular, to a message pushing method for a virtual gift and an electronic device.

BACKGROUND

With the development of information technology, the live broadcast platform has developed accordingly. Among the common web live broadcast platforms, in order to increase the playfulness of the interaction between a host and a user, in order to encourage the host to produce more high-quality content of live video, an option of virtual gifts is usually designed at the bottom of the web page of the live video.

The user watching the live broadcast can interact with the host by giving the host a virtual gift. When the host receives a virtual gift given by the user who watches the live broadcast to the host in the live broadcast room, information of the received virtual gift will be announced in the live broadcast room, for example, "X user gives Y gift to the host" will be announced in the live broadcast to notify the users watching the live broadcast in the live broadcast room.

During the process of research, the inventor found that the prior art has the following technical problems: when the host receives a virtual gift giving by a user, the method of publishing notification information about receipt of the virtual gift is single.

SUMMARY

The present disclosure provides a message pushing method for a virtual gift, an apparatus, an electronic device and a computer-readable storage medium, to solve the problems that the method of publishing notification information about receipt of the virtual gift is single and the user experience is poor. The technical solutions are as follows:

A first aspect provides a message pushing method for a virtual gift, where the method comprises:

when the virtual gift is received in a live broadcast room, determining a live broadcast room area to which a notification message is pushed, where the notification message is used to inform all live broadcast rooms in the live broadcast room area that the virtual gift is received; and pushing the notification message to each live broadcast room in the live broadcast room area respectively.

A second aspect provides a message pushing apparatus for a virtual gift, where the apparatus comprises:

a first determining module, configured to when the virtual gift is received in a live broadcast room, determine a live broadcast room area to which a notification message is pushed, wherein the notification message is used to inform all live broadcast rooms in the live broadcast room area that the virtual gift is received; and a pushing module, configured to push the notification message to each live broadcast room in the live broadcast room area respectively.

A third aspect provides an electronic device, where the electronic device comprises:

one or more processors;

a memory; and one or more application programs, wherein the one or more application programs are stored in the memory and are configured to be executed by the one or more processors, the one or more programs are configured to: execute operation corresponding to the message pushing method for the virtual gift according to the first aspect or any one of possible implementations of the first aspect.

A fourth aspect provides a computer-readable storage medium, wherein the storage medium has at least one instruction, at least one program, a code set or an instruction set stored thereon, and the at least one instruction, the at least one program, the code set or the instruction set are loaded and executed by the processor to implement the message pushing method for the virtual gift according to the first aspect or any one of possible implementations of the first aspect.

The beneficial effects brought about by the technical solution provided by the present disclosure are as follows.

The present disclosure provides a message pushing method for a virtual gift, an apparatus, an electronic device and a computer-readable storage medium. The present disclosure, when the virtual gift is received in a live broadcast room, determines a live broadcast room area to which a notification message is pushed, where the notification message is used to inform all live broadcast rooms in the live broadcast room area that the live broadcast room receive the virtual gift, and pushes the notification message to each live broadcast room in the live broadcast room area respectively. That is to say, in the present disclosure, when a virtual gift is received in the live broadcast room, the notification message can be posted in each live broadcast room in the corresponding live broadcast room area, rather than only posting the message about receipt of the virtual gift in the live broadcast room where the virtual gift is received, which can enrich the methods for posting notification information about the virtual gift, so that when virtual gift information is received in a live broadcast room, related notification messages can be received in multiple associated live broadcast rooms, thereby reducing the operation cost and resource consumption of triggering notification messages in multiple live broadcast rooms, meanwhile improving the efficiency of information dissemination and user experience.

BRIEF DESCRIPTION OF DRAWINGS

In order to describe technical solutions in the embodiments of the present disclosure more clearly, the following will briefly introduce the drawings that need to be used in the description of the embodiments of the present disclosure.

DESCRIPTION OF EMBODIMENTS

Figure 1:
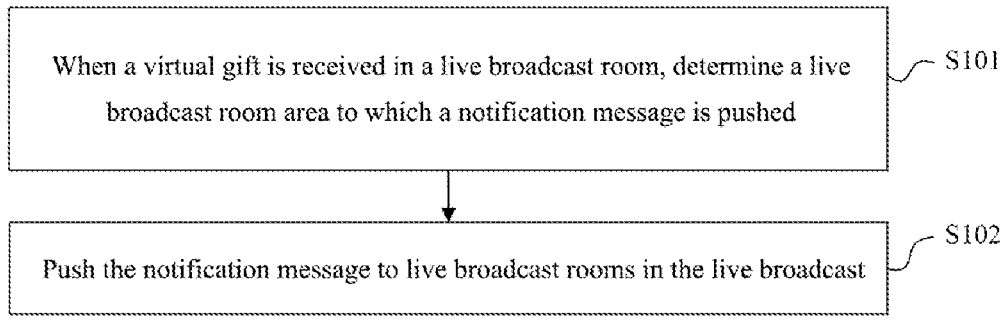
FIG. 1 is a schematic flowchart of a message pushing method for a virtual gift according to an embodiment of the present disclosure.

Embodiments of the present disclosure are described in detail below, examples of the embodiments are shown in the accompanying drawings, in which the same or similar reference numerals indicate the same or similar elements with same or similar functions. The embodiments described below with reference to accompanying drawings are exemplary, and are only used to explain the present disclosure, which cannot be construed as limiting the present disclosure.

Those skilled in the art can understand that, unless specifically stated otherwise, the singular forms "a", "an", "said" and "the" used herein may also include plural forms. It should be further understood that the term "comprising" used in the specification of the present disclosure refers to the presence of the described features, integers, steps, operations, elements and/or components, but does not exclude the presence or addition of one or more other features, integers, steps, operations, elements, components, and/or combinations thereof. It should be understood that when we refer to an element as being "connected" or "coupled" to another element, it can be directly connected or coupled to the other element, or intermediate elements may also be present. In addition, "connected" or "coupled" used herein may include wireless connection or wireless coupling. The term "and/or" as used herein includes all or any unit and all combinations of one or more associated listed items.

In order to make the objectives, technical solutions, and advantages of the present disclosure clearer, the following further describes the embodiments of the present disclosure in detail with reference to the accompanying drawings.

Embodiments of the present disclosure provide a message pushing method for a virtual gift, as shown in FIG. 1, including:

S101, when the virtual gift is received in a live broadcast room, determine a live broadcast room area to which a notification message is pushed, where the notification message is used to inform all live broadcast rooms in the live broadcast room area that the live broadcast room receive the virtual gift given by the user.

For the embodiment of the present disclosure, S101 may be performed by a client or a server, which is not limited in the embodiment of the present disclosure.

In an embodiment, when the client detects that the virtual gift given by a user is received in the live broadcast room, the client may determine a live broadcast room area to which a corresponding notification message corresponding thereto; or, when the client detects that the virtual gift given by a user is received in the live broadcast room, the client requests the server to acquire the live broadcast room area to which the notification message corresponding to the virtual gift is pushed. After the server receives the request message, the server sends the client the live broadcast room area to which the notification message is pushed, so that the client determines the live broadcast room area to which the notification message is pushed.

In an embodiment, when the server detects that a virtual gift given by a user is received in the live broadcast room, the server determines the live broadcast room area to which the notification message is pushed.

In an embodiment, S101 can include that: when it is detected that a virtual gift given by a user is received in any live broadcast room, determine the live broadcast room area to which the notification message is pushed; or, when it is detected that the virtual gift given by the user is received in any specific live broadcast room, determine the live broadcast room area to which the notification message is pushed. In the embodiment of the present disclosure, the specific live broadcast room may be a live broadcast room of a specific type, such as a music-type live broadcast room or a gossip-type live broadcast room, or a preset live broadcast room, where the preset live broadcast room is a preset setting live broadcast room, which can push the notification message to the determined live broadcast room area when the virtual gift is received. In the embodiment of the present disclosure, the type of a specific live broadcast room is not limited.

In an embodiment, before step S101, the live broadcast rooms can be divided in region. Specifically, the live broadcast rooms can be divided in region according to the type of the live broadcast rooms, or the live broadcast rooms can be divided in region according to the number of fans of a host, or the live broadcast rooms can be divided in region according to the number of people watching the live broadcast room in the live broadcast room. The specific dividing method is not limited.

S102: pushing the notification message to each live broadcast room in the live broadcast room area respectively.

In an embodiment, in S101, after the live broadcast room area to which the notification message is pushed is determined, the notification message is pushed to each live broadcast room in the live broadcast room area respectively.

In an embodiment, S102 may be performed by the client or the server. It is not limited in the embodiment of the present disclosure.

The embodiments of the present disclosure provide a message pushing method for a virtual gift. The embodiment of the present disclosure, when it is detected that the virtual gift given by a user is received in a live broadcast room, determines a live broadcast room area to which a notification message is pushed, where the notification message is used to inform all live broadcast rooms in the live broadcast room area that the live broadcast room receive the virtual gift given by the user, and pushes the notification message to each live broadcast room in the live broadcast room area respectively. That is to say, in the embodiment of the present disclosure, when it is detected that a virtual gift given by a user is received in the live broadcast room, the notification message can be posted in each live broadcast room in the corresponding live broadcast room area, rather than only posting the message about receipt of the virtual gift in the live broadcast room where the virtual gift is received, which can enrich the methods for posting notification information about the virtual gift, thereby improving user experience.

In some embodiments, the notification message includes at least one of the following:

information of a host receiving the virtual gift;

information of the virtual gift received;

information of the live broadcast room receiving the virtual gift; and information of a user giving the virtual gift.

In an embodiment, the information of the host receiving the virtual gift may include at least one of the following: ID information of the host receiving the virtual gift on the live broadcast platform; and name information of the host receiving the virtual gift on the live broadcast platform.

In an embodiment, information of the virtual gift received includes at least one of the following: name information corresponding to the virtual gift received; and virtual asset information corresponding to the virtual gift received.

In some embodiments, the information of the live broadcast room receiving the virtual gift includes at least one of the following:

live broadcast cover information corresponding to the live broadcast room receiving the virtual gift; information of the number of people watching a live broadcast corresponding to the live broadcast room receiving the virtual gift; and brief information of live broadcast contents corresponding to the live broadcast room receiving the virtual gift.

In an embodiment, the information of the user giving the virtual gift includes at least one of the following:

ID information of the user giving the virtual gift on the live broadcast platform; name information of the user giving the virtual gift on the live broadcast platform; and corresponding user level information of the user giving the virtual gift on the live broadcast platform.

In an embodiment, the pushed notification message includes at least one of the information of the host receiving the virtual gift, the information of the virtual gift received, the information of the live broadcast room receiving the virtual gift; and the information of the user giving the virtual gift, which can enrich display forms for pushing the notification message, can also attract users who have watched the notification message to enter the live broadcast room, thereby improving user experience.

In some embodiments, the determine a live broadcast room area to which a notification message is pushed, includes at least one of: S1011 (not shown in the figure), S1012 (not shown in the figure), S1013 (not shown in the figure), S1014 (not shown in the figure) and S1015 (not shown in the figure), where S1011: determine level information of the virtual gift, and determine the live broadcast room area to which the notification message is pushed based on the level information of the virtual gift.

In some embodiments, the determine the live broadcast room area to which the notification message is pushed based on the level information of the virtual gift, includes: acquire a first preset relationship, where the first preset relationship is a corresponding relationship between a virtual gift and a respective live broadcast room area to which a notification message is pushed; and determine the live broadcast room area to which the notification message is pushed based on the level information of the virtual gift given by the user and the first preset relationship.

For example, a live broadcast room area to which a notification message is pushed corresponding to a first-level virtual gift is live broadcast room area 1, a live broadcast room area to which a notification message is pushed corresponding to a second-level virtual gift is live broadcast room area 2, and a live broadcast room area to which a notification message is pushed corresponding to a third-level virtual gift is the live broadcast room area 3; when the level information of the virtual gift given by the user is second-level, the live broadcast room area to which the notification message is pushed is determined to be the live broadcast room area 2.

In an embodiment, the first preset relationship may be stored in the client, may also be stored in the server, or may also be stored in other external devices. It is not limited in the embodiment of the present disclosure.

In an embodiment, the virtual gift is displayed in a virtual gift display area according to different identifiers based on the level information of the virtual gift. For example, the first-level virtual gift is displayed through a red identifier in the virtual gift display area, and the second-level virtual gift is displayed through a yellow identifier in the virtual gift display area.

S1012: determine a live broadcast type corresponding to the live broadcast room, and determine the live broadcast room area to which the notification message is pushed based on the live broadcast type corresponding to the live broadcast room.

In some embodiments, the determine the live broadcast room area to which the notification message is pushed based on the live broadcast type corresponding to the live broadcast room, includes: acquire a second preset relationship, where the second preset relationship is a corresponding relationship between a live broadcast type and a respective live broadcast room area to which a notification message is pushed; and determine the live broadcast room area to which the notification message is pushed based on the live broadcast type corresponding to any live broadcast room and the second preset relationship.

For example, a live broadcast room area to which a notification message is pushed corresponding to the live broadcast type of a music type is a music-type live broadcast room and a dance-type live broadcast room; a live broadcast room area to which a notification message is pushed corresponding to the live broadcast type of a gossip type is a gossip-type live broadcast room and a chat-type live broadcast room; when the live broadcast type corresponding to the live broadcast room receiving the virtual gift is the music type, the live broadcast room area to which the notification message is pushed is all music-type live broadcast rooms and all dance-type live broadcast rooms.

In an embodiment, the second preset relationship may be stored in the client, may also be stored in the server, or may also be stored in other external devices. It is not limited in the embodiment of the present disclosure.

S1013: determine level information corresponding to a user giving the virtual gift, and determine the live broadcast room area to which the notification message is pushed based on the level information corresponding to the user giving the virtual gift.

In some embodiments, the determine the live broadcast room area to which the notification message is pushed based on the level information corresponding to the user giving the virtual gift, includes: acquire a third preset relationship, where the third preset relationship is a corresponding relationship between user level information and a respective live broadcast room area to which a notification message is pushed; and determine the live broadcast room area to which the notification message is pushed based on the level information corresponding to the user giving the virtual gift and the third preset relationship.

For example, it is preset that a live broadcast room area to which a notification message is pushed corresponding to user level 1 is live broadcast room area 1, a live broadcast room area to which a notification message is pushed corresponding to user level 2 is live broadcast room area 2, and a live broadcast room area to which a notification message is pushed corresponding to user level 3 is live broadcast room area 3; when the virtual gift is a virtual gift given by the user level 2, the live broadcast room area to which the notification message is pushed is determined to be the live broadcast room area 2.

In an embodiment, the third preset relationship may be stored in the client, may also be stored in the server, or may also be stored in other external devices. It is not limited in the embodiment of the present disclosure.

S1014: determine preference information corresponding to a user giving the virtual gift, and determine the live broadcast room area to which the notification message is pushed based on the preference information corresponding to the user giving the virtual gift;

where the preference information corresponding to the user giving the virtual gift is used to represent live broadcast room information preferred by the user giving the virtual gift.

In an embodiment, the preference information corresponding to the user giving the virtual gift is determined based on big data, and the live broadcast room area to which the notification message is pushed is determined based on the preference information corresponding to the user giving the virtual gift. In an embodiment, the big data may be data with user authorization obtained in various ways. The preference information corresponding to the user giving the virtual gift is specifically determined in detail below, and will not be repeated here.

In an embodiment, the steps for determining preference information corresponding to a user giving the virtual gift, include: acquire historical operation information of the user giving the virtual gift on the live broadcast platform; and determining a live broadcast room preferred by the user giving the virtual gift and/or a live broadcast room type preferred by the user giving the virtual gift as the preference information corresponding to the user giving the virtual gift, based on acquired historical operation information.

In the embodiments, the historical operation information may be agreed by the user in various ways in advance.

The historical operation information of the user giving the virtual gift on the live broadcast platform comprises at least one of the following:

a number of clicks to enter each live broadcast room, time duration to watch a live broadcast in each live broadcast room, a number of comment information posted in each live broadcast room, and likes respectively corresponding to each live broadcast room.

In an embodiment, the historical operation information of the user giving the virtual gift on the live broadcast platform is obtained for a period of time, and the live broadcast room preferred by the user giving the virtual gift and/or the live broadcast room type preferred by the user giving the virtual gift is determined by the historical operation information of the user giving the virtual gift during the period of time is obtained on the live broadcast platform, and the notification message is pushed to the live broadcast room and/or the live broadcast room type determined.

For example, a live broadcast room that the user giving the virtual gift frequently enters in the last month (such as: XXX live broadcast room and YYY live broadcast room) and/or a live broadcast room type that the user giving the virtual gift frequently enters (music-type live broadcast room) is determined based on historical operation information of the user giving the virtual gift on the live broadcast platform in the last month, and the notification message corresponding to the virtual gift is pushed to the XXX live broadcast room and the YYY live broadcast room respectively, or the notification message is pushed to each live broadcast room corresponding to the music type respectively.

In an embodiment, the more times the user giving the virtual gift clicks into a certain live broadcast room, the more the user giving the virtual gift prefers the live broadcast room; the longer the time the user giving the virtual gift watches the live broadcast in a certain live broadcast room, the more the user giving the virtual gift prefers the live broadcast room; the more times the user giving the virtual gift posts comment information, the more the user giving the virtual gift prefers the live broadcast room; the more the number of likes of the user giving the virtual gift in a certain live broadcast room, the more the user giving the virtual gift prefers the live broadcast room.

S1015: determine the live broadcast room area to which the notification message is pushed based on the virtual gift and a corresponding relation between a virtual gift and a respective live broadcast room area to which a notification message is pushed.

In an embodiment, the preference information corresponding to the user giving the virtual gift is determined based on the historical operation information of the user giving the virtual gift on the live broadcast platform, and the live broadcast room area to which the notification message, which is that the user giving the virtual gift gives the virtual gift, is pushed is determined based on the preference information corresponding to the user giving the virtual gift. That is to say, the notification message is pushed to the live broadcast room corresponding to the user giving the virtual gift or the live broadcast room of the live broadcast type, so that more targeted notification messages can be pushed, which can further improve the user experience.

In some embodiments, if it is detected that a plurality of virtual gifts given by at least one user are received within a preset duration in any live broadcast room, and at least two virtual gifts corresponding to a same live broadcast room area to which a notification message is pushed, step S102 can include: at least one of S1021 (not shown in the figure) and S1022 (not shown in the figure), where S1021: push notification messages respectively corresponding to the at least two virtual gifts to each live broadcast room in the live broadcast room area respectively.

In an embodiment, a specific pushing sequence is described in detail in the following embodiment. In the embodiment of the present disclosure, the notification messages corresponding to the at least two virtual gifts respectively are pushed to each live broadcast room in the live broadcast room area respectively according to the determined pushing order for pushing the notification message.

S1022: determine a notification message corresponding to each virtual gift of the at least two virtual gifts respectively, combine the notification messages corresponding to each virtual gift respectively, generate a combined notification message, such as a specific notification message, and push the specific notification message to each live broadcast room in the live broadcast room area respectively.

In the embodiment, the determining an order of pushing the notification message is performed according to at least one of the following:

level information corresponding to each virtual gift of the at least two virtual gifts respectively;

user level information of each user giving the at least two virtual gifts respectively; and receiving time for receiving each virtual gift of the at least two virtual gifts.

In an embodiment, the combined notification message includes: information corresponding to users giving each virtual gift respectively; and, and/or identification information respectively corresponding to each virtual gift.

In one embodiment, if it is detected that a plurality of virtual gifts given by at least one user are received within a preset duration in the live broadcast room, and the at least two virtual gifts corresponding to the same live broadcast room area to which the notification message is pushed, when determining the notification message corresponding to each of the at least two virtual gifts respectively, the notification messages corresponding to each virtual gifts is combined into one notification message, and a combined notification message is pushed to each live broadcast room in the live broadcast room area.

For example, if it is detected that a virtual gift 1 and a virtual gift 2 given by at least one user are received within a preset duration in any live broadcast room, and the at least two virtual gifts corresponding to the same live broadcast room area to which the notification message is pushed, then a notification message corresponding to the virtual gift 1 and a notification message corresponding to the virtual gift 2 are combined to obtain a combined notification message. The combined notification message may include information of the virtual gift 1 and information of the virtual gift 2.

The combined notification message includes: information corresponding to users giving each virtual gift respectively; and, and/or identification information respectively corresponding to each virtual gift.

In one embodiment, if it is detected that a plurality of virtual gifts given by a certain user are received within a preset duration in a live broadcast room, and the at least two virtual gifts corresponding to the same live broadcast room area to which the notification message is pushed, the notification messages corresponding to each of the plurality of virtual gifts are combined into one notification message, and the combined notification message is pushed to each live broadcast room in the determined live broadcast room area.

For example, if it is detected that the virtual gifts given by a user A received within the preset duration in the live broadcast room A are a virtual gift 3 and a virtual gift 4, and a live broadcast room area to which a notification message is pushed corresponding to the virtual gift 3 and the virtual gift 4 respectively are both the live broadcast room area of a music-type, the notification message corresponding to the virtual gift 3 (for example, the notification message can be that "A live broadcast room receives the virtual gift 3 given by the user A"), and the notification message corresponding to the virtual gift 4 (for example, the notification message can be that "A live broadcast room receives the virtual gift 4 given by the user A"), are combined into one notification message (for example, the combined notification message can be that "A live broadcast room receives the virtual gift 3 and the virtual gift 4 given by the user A"), and the combined notification messages are pushed to each music-type live broadcast room.

In one embodiment, if it is detected that a plurality of virtual gifts given by a plurality of users are received within a preset duration in a live broadcast room (the virtual gifts given by each user can be the same or different), and the live broadcast room area to which the notification message is pushed corresponding to each of the plurality of virtual gifts are the same, the notification messages respectively corresponding to each of the plurality of virtual gifts are combined into one notification message, and the combined notification message is pushed to each live broadcast room in the determined live broadcast room area.

For example, if it is detected that the live broadcast room A receives virtual gift 5 given by user B and virtual gift 6 given by user C within a preset duration, the live broadcast room area to which the notification message is pushed corresponding to the virtual gift 5 and the virtual gift 6 are both the live broadcast room area of a gossip type, the notification message corresponding to the virtual gift 5 (for example, the notification message can be that "A live broadcast room receives the virtual gift 5 given by the user B") and the notification message corresponding to the virtual gift 6 (for example, the notification message can be "A live broadcast room receives the virtual gift 6 given by the user C"), then the notification message corresponding to virtual gift 5 and the notification message corresponding to virtual gift 6 are combined into one notification message (the combined notification message can be that "A live broadcast room receives the virtual gift 5 given by user B and the virtual gift 6 given by the user C"), and the combined notification message is pushed to each gossip-type live broadcast room.

For example, if it is detected that the live broadcast room A receives virtual gift 5 given by user B and virtual gift 5 given by user C within a preset duration, and a notification message corresponding to the virtual gift 5 (for example, the notification message can be that "A live broadcast room receives the virtual gift 5 given by the user B" and "A live broadcast room receives the virtual gift 5 given by the user C"), the two piece of notification messages corresponding to the virtual gift 5 are combined into one notification message (for example, the combined notification message can be that "A live broadcast room receives the virtual gift 5 given by the user B and C"), and the combined notification messages are pushed to each music-type live broadcast room.

In one embodiment, if it is detected that a plurality of virtual gifts given by at least one user are received within a preset duration in a certain live broadcast room, and the at least two virtual gifts corresponding to the same live broadcast room area to which the notification message is pushed, the notification message corresponding to each of the at least two virtual gifts are determined respectively, specific notification messages are generated based on the notification messages corresponding to each virtual gift, the specific notification messages are pushed to each live broadcast room in the live broadcast room area respectively. That is to say, the notification messages corresponding to a plurality of virtual gifts with the same pushing area are combined into one notification message for pushing, which can reduce overhead for pushing the notification message, thereby avoiding the notification message from being pushed frequently in a short time period, which causes worse experience of users watching the live broadcast in each live broadcast room.

In some embodiments, before step S1021, the method may further includes:

determine an order of pushing the notification message respectively corresponding to the at least two virtual gifts based on at least one of the following:

level information corresponding to each virtual gift of the at least two virtual gifts respectively;

user level information of each user giving the at least two virtual gifts respectively; and receiving time for receiving each virtual gift of the at least two virtual gifts.

In an embodiment, the preset duration may be preset by the client or the server, which is not limited in the embodiment of the present disclosure. For example, the preset duration can be 5 seconds, 10 seconds or 20 seconds.

In one embodiment, if it is detected that a plurality of virtual gifts given by at least one user are received within a preset duration in a certain live broadcast room, and the at least two virtual gifts corresponding to the same live broadcast room area to which the notification message is pushed, the order of pushing the notification messages respectively corresponding to the at least two virtual gifts is determined based on a level corresponding to each of the at least two virtual gifts.

For example, if it is detected that a certain live broadcast room receives a plurality of virtual gifts given by at least one user within a preset duration, which are a virtual gift 1, a virtual gift 2, and a virtual gift 3, and the virtual gift 1 is a first-level virtual gift, the virtual gift 2 is a third-level virtual gift and the virtual gift 3 is a second-level virtual gift, it is determined to push the notification message corresponding to the virtual gift 1 firstly, push the notification message corresponding to the virtual gift 3 secondly, and then push the notification message corresponding to the virtual gift 2.

In one embodiment, if it is detected that a plurality of virtual gifts given by at least two users are received within a preset duration in a certain live broadcast room, and the at least two virtual gifts corresponding to the same live broadcast room area to which the notification message is pushed, the order of pushing the notification message respectively corresponding to the at least two virtual gifts is determined based on user level information corresponding to each user giving the at least two virtual gifts respectively. In the embodiment of the present disclosure, if a user level of a user giving a virtual gift is higher than a user level of another user giving a virtual gift, a notification message corresponding to the virtual gift given by the user with a higher level is preferentially pushed.

For example, it is detected that XX live broadcast room receives two virtual gifts given by user 1 and a virtual gift given by user 2, within a preset duration and a user level of user 1 is higher than a user level of user 2, then a notification message corresponding to the two virtual gifts given by user 1 is determined to be pushed preferentially and then a notification message corresponding to the virtual gift given by user 2 is pushed.

In one embodiment, if it is detected that a plurality of virtual gifts given by at least one user are received within a preset duration in a live broadcast room, and the at least two virtual gifts corresponding to the same live broadcast room area to which the notification message is pushed, the order of pushing the notification messages corresponding to each of the at least two virtual gifts respectively is determined based on an order of a receiving time when each of the at least two virtual gifts is received.

For example, if it is detected that the live broadcast room receives a virtual gift 1 and a virtual gift 2 within a preset duration, and the virtual gift 1 is received firstly, and then the virtual gift 2 is received, the notification message corresponding to the virtual gift 1 is pushed firstly, and then the notification message corresponding to the virtual gift 2 is pushed.

In an embodiment, the above-mentioned embodiments may be executed by the server, or executed by the client, or partly executed by the server and partly executed by the client. It is not limited in the embodiment of the present disclosure.

The foregoing embodiment introduces a message pushing method for a virtual gift from the perspective of method flow, and a message pushing apparatus for a virtual gift is introduced below from the perspective of the virtual module, which is specifically as follows.

Figure 2:
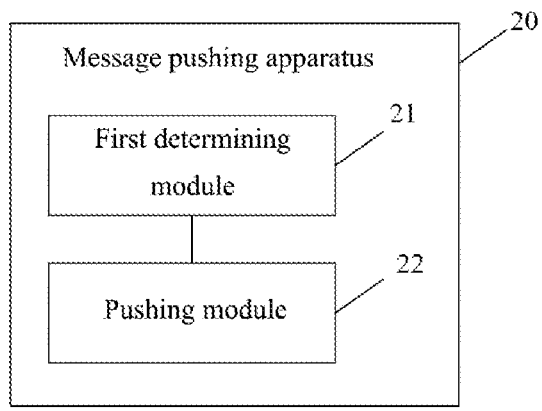
FIG. 2 is a schematic structural diagram of a message pushing apparatus for a virtual gift according to an embodiment of the present disclosure.

The embodiments of the present disclosure provide a message pushing apparatus for a virtual gift. As shown in FIG. 2, the message pushing apparatus for a virtual gift can be the message pushing apparatus 20 for a virtual gift may include: a first determining module 21 and a pushing module 22, where, the first determining module is configured to, when it is detected that the virtual gift given by a user is received in a live broadcast room, determine a live broadcast room area to which a notification message is pushed, where the notification message is used to inform all live broadcast rooms in the live broadcast room area that the live broadcast room receives the virtual gift given by the user; and the pushing module 22 is configured to push the notification message to each live broadcast room in the live broadcast room area respectively.

The embodiments of the present disclosure provide a message pushing apparatus for a virtual gift. The embodiment of the present disclosure, when it is detected that the virtual gift given by a user is received in a live broadcast room, determines a live broadcast room area to which a notification message is pushed, where the notification message is used to inform all live broadcast rooms in the live broadcast room area that the live broadcast room receive the virtual gift given by the user, and pushes the notification message to each live broadcast room in the live broadcast room area respectively. That is to say, in the embodiment of the present disclosure, when it is detected that a virtual gift given by a user is received in the live broadcast room, the notification message can be posted in each live broadcast room in the corresponding live broadcast room area, rather than only posting the message about receipt of the virtual gift in the live broadcast room where the virtual gift is received, which can enrich the methods for posting notification information about the virtual gift, thereby improving user experience.

In a possible implementation of the embodiment of the present disclosure, the first determining module 21 is specifically configured to determine level information of the virtual gift given by the user, and determine the live broadcast room area to which the notification message is pushed based on the level information of the virtual gift given by the user; and/or determine a live broadcast type corresponding to the live broadcast room, and determine the live broadcast room area to which the notification message is pushed based on the live broadcast type corresponding to the live broadcast room; and/or determine level information corresponding to a user giving the virtual gift, and determine the live broadcast room area to which the notification message is pushed based on the level information corresponding to the user giving the virtual gift; and/or determine preference information corresponding to a user giving the virtual gift, and determine the live broadcast room area to which the notification message is pushed based on the preference information corresponding to the user giving the virtual gift, wherein the preference information corresponding to the user giving the virtual gift is used to represent live broadcast room information preferred by the user giving the virtual gift; and/or determine the live broadcast room area to which the notification message is pushed based on the virtual gift given by the user and a corresponding relation between a virtual gift and a respective live broadcast room area to which a notification message is pushed.

In some embodiments, the first determining module 21 includes: a first acquiring unit and a first determining unit, where the first acquiring unit is configured to acquire a first preset relationship, where the first preset relationship is a corresponding relationship between a virtual gift and a respective live broadcast room area to which a notification message is pushed;

the first determining unit is configured to determine the live broadcast room area to which the notification message is pushed based on the level information of the virtual gift given by the user and the first preset relationship acquired by the first acquiring unit.

In some embodiments, the first determining module 21 includes: a second acquiring unit and a second determining unit, where
- the second acquiring unit is configured to acquire a second preset relationship,
- where the second preset relationship is a corresponding relationship between a live broadcast type and a respective live broadcast room area to which a notification message is pushed;
- the second determining unit is configured to determine the live broadcast room area to which the notification message is pushed based on the live broadcast type corresponding to the live broadcast room and the second preset relationship acquired by the second acquiring unit.

In some embodiments, the first determining module 21 includes: a third acquiring unit and a third determining unit, where,
- the third acquiring unit is configured to acquire a third preset relationship,
- where the third preset relationship is a corresponding relationship between user level information and a respective live broadcast room area to which a notification message is pushed;
- the third determining unit is configured to determine the live broadcast room area to which the notification message is pushed based on the level information corresponding to the user giving the virtual gift and the third preset relationship acquired by the third acquiring unit.

In some embodiments, the first determining module 21 includes: a fourth acquiring unit and a fourth determining unit, where,
- the fourth acquiring unit is configured to acquire historical operation information of the user giving the virtual gift on a live broadcast platform;
- the fourth determining unit is configured to determine a live broadcast room preferred by the user giving the virtual gift and/or a live broadcast room type preferred by the user giving the virtual gift as the preference information corresponding to the user giving the virtual gift, based on acquired historical operation information.

The historical operation information of the user giving the virtual gift on the live broadcast platform comprises at least one of the following:
- a number of clicks to enter each live broadcast room, time duration to watch a live broadcast in each live broadcast room, a number of comment information posted in each live broadcast room, and likes respectively corresponding to each live broadcast room.

In an embodiment, the first acquiring unit, the second acquiring unit, the third acquiring unit, and the fourth acquiring unit may all be the same acquiring unit, may all be different acquiring units, or any two of them may be the same acquiring units, or any three of them may be the same acquiring units. It is not limited in the embodiment of the present disclosure.

In an embodiment, the first determining unit, the second determining unit, the third determining unit, and the fourth determining unit may all be the same determining unit, may all be different determining units, or any two of them may be the same determining units, or any three of them may be the same determining units. It is not limited in the embodiment of the present disclosure.

In some embodiments, when it is detected that a plurality of virtual gifts given by at least one user are received within a preset duration in the live broadcast room, and at least two virtual gifts corresponding to a same live broadcast room area to which a notification message is pushed, the pushing module 22 is specifically configured to push notification messages respectively corresponding to the at least two virtual gifts to each live broadcast room in the live broadcast room area respectively; and/or determine a notification message corresponding to each virtual gift of the at least two virtual gifts respectively, generate specific notification messages based on the notification message corresponding to each virtual gift, combine the notification messages corresponding to each virtual gift respectively, and push a combined notification message to each live broadcast room in the live broadcast room area respectively.

In some embodiments, the combined notification message includes at least one of the following: information corresponding to users giving each virtual gift respectively; and identification information respectively corresponding to each virtual gift.

In some embodiments, the apparatus further includes: a second determining module, where
the second determining module is configured to determine an order of pushing the notification message respectively corresponding to the at least two virtual gifts based on at least one of the following:
- level information corresponding to each virtual gift of the at least two virtual gifts respectively;
- user level information of each user giving the at least two virtual gifts respectively; and
- receiving time for receiving each virtual gift of the at least two virtual gifts.

In an embodiment, the first determining module 21 and the second determining module may be the same determining module, or may be different determining modules. It is not limited in the embodiment of the present disclosure.

In some embodiments, the notification message includes at least one of the following:
- information of a host receiving the virtual gift;
- information of the virtual gift received;
- information of the live broadcast room receiving the virtual gift; and
- information of a user giving the virtual gift.

The message pushing method for a virtual gift in the embodiment of the present disclosure can be implemented in the above method embodiments, and the implementation principles are similar, which will not be repeated here.

The foregoing embodiment introduces a message pushing method for a virtual gift from the perspective of method flow, and a message pushing apparatus for a virtual gift is introduced from the perspective of the virtual module, and an electronic device is introduced from the perspective of the physical device which is specifically as follows.

Referred to FIG. 3 below, it shows a schematic structural diagram of an electronic device 300 adapted to implementing embodiments of the present disclosure. The electronic device in the embodiment of the present disclosure may include, but are not limited to, a mobile terminal, such as a mobile phone, a notebook computer, a digital broadcast receiver, a PDA (personal digital assistant), a PAD (portable android device), a PMP (portable multimedia player), a vehicle terminal (for example, vehicle navigation terminal) and a fixed terminal such as a digital TV (television), a desktop computer, etc. The electronic device shown in FIG.

3 is only an example, and should not bring any limitation to the function and scope of use for the embodiments of the present disclosure.

Figure 3:
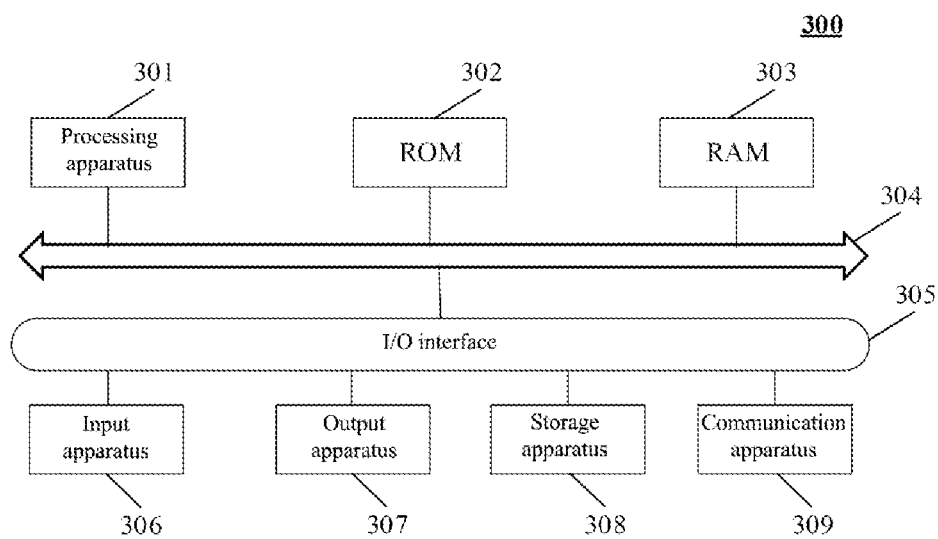
FIG. 3 is a schematic structural diagram of a message pushing electronic device for a virtual gift according to an embodiment of the present disclosure.

As shown in FIG. 3, the electronic device 300 may include a processing apparatus 301 (such as a central processing unit, a graphics processor, etc.), which may execute suitable actions and processing according to programs stored in a read-only memory (ROM) 302 or programs loaded into a random access memory (RAM) 303 from a storage apparatus 308. In the RAM 303, various programs and data required for the operation of the electronic device 300 are also stored. The processing device 301, the ROM 302, and the RAM 303 are connected to each other through a bus 304. An input/output (I/O) interface 305 is also connected to the bus 304.

Generally, the following devices can be connected to the I/O interface 305: including an input apparatus 306, such as a touch screen, a touch pad, a keyboard, a mouse, a camera, a microphone, an accelerometer, a gyroscope, etc.; including an output apparatus 307, such as a liquid crystal display (LCD), a speaker, a vibrations, etc.; including a storage apparatus 308, such as a magnetic tape, a hard disk, etc.; and a communication apparatus 309. The communication apparatus 309 may allow the electronic device 300 to perform wireless or wired communication with other devices to exchange data. Although FIG. 3 shows an electronic device 300 having various devices, it should be understood that it is not required to implement or have all of the illustrated devices. It may alternatively be implemented or provided with more or fewer devices.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program codes for executing the method shown in the flowchart. In such an embodiment, the computer program may be downloaded and installed from the network through the communication apparatus 309, or installed from the storage apparatus 308, or installed from the ROM 302. When the computer program is executed by the processing apparatus 301, the above-mentioned functions defined in the method of the embodiments of the present disclosure are executed.

The embodiments of the present disclosure provide an electronic device. The electronic device in the embodiment of the present disclosure includes: a memory and a processor, at least one program stored in the memory, which is configured to, when executed by the processor, implement the following: in the present disclosure, when a virtual gift given by a user is received in a live broadcast room, determining a live broadcast room area to which a notification message is pushed, where the notification message is used to inform all live broadcast rooms in the live broadcast room area that the live broadcast room receive the virtual gift given by the user, and pushing the notification message to each live broadcast room in the live broadcast room area respectively. That is to say, in the present disclosure, when it is detected that a virtual gift given by a user is received in the live broadcast room, the notification message can be posted in each live broadcast room in the corresponding live broadcast room area, rather than only posting the message about receipt of the virtual gift in the live broadcast room where the virtual gift is received, which can enrich the methods for posting notification information about the virtual gift, thereby improving user experience.

The above-mentioned electronic device is adapted to the above-mentioned method embodiment, which is not limited herein.

The embodiments of the present disclosure provide a computer-readable storage medium with computer programs stored thereon, and when the computer programs run on a computer, the computer can execute the corresponding content in the foregoing method embodiment. The embodiment of the present disclosure, when it is detected that the virtual gift given by a user is received in a live broadcast room, determines a live broadcast room area to which a notification message is pushed, where the notification message is used to inform all live broadcast rooms in the live broadcast room area that the live broadcast room receive the virtual gift given by the user, and pushes the notification message to each live broadcast room in the live broadcast room area respectively. That is to say, in the embodiment of the present disclosure, when it is detected that a virtual gift given by a user is received in the live broadcast room, the notification message can be posted in each live broadcast room in the corresponding live broadcast room area, rather than only posting the message about receipt of the virtual gift in the live broadcast room where the virtual gift is received, which can enrich the methods for posting notification information about the virtual gift, thereby improving user experience.

It should be noted that the above-mentioned computer-readable medium in the present disclosure may be a computer-readable signal medium or a computer-readable storage medium, or any combination thereof. The computer-readable storage medium may be, for example, but not limited to, an electrical, a magnetic, an optical, an electromagnetic, an infrared, or a semiconductor system, apparatus, or device, or any combination thereof. More specific examples of computer-readable storage media may include, but are not limited to: electrical connections with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that includes or stores programs, and the programs may be used by or in combination with an instruction execution system, an apparatus, or a device. In the present disclosure, a computer-readable signal medium may include a data signal propagated in a baseband or as a part of a carrier wave, and a computer-readable program code is carried therein. This propagated data signal can take many forms, including but not limited to electromagnetic signal, optical signal, or any suitable combination thereof. The computer-readable signal medium may also be any computer-readable medium other than the computer-readable storage medium. The computer-readable signal medium may send, propagate, or transmit the programs for use by or in combination with the instruction execution system, apparatus, or device. The program code included on the computer-readable medium can be transmitted by any suitable medium, including but not limited to: wire, optical cable, RF (Radio Frequency), etc., or any suitable combination thereof.

The above-mentioned computer-readable medium may be included in the above-mentioned electronic device; or it may exist alone without being assembled into the electronic device.

The above computer-readable medium carries one or more programs, and when the foregoing one or more programs are executed by the electronic device, causes the electronic device to execute the message pushing method for a virtual gift shown in the foregoing method embodiment.

The computer program code used to perform the operations of the present disclosure can be written in one or more programming languages or a combination thereof. The above-mentioned programming languages include object-oriented programming languages—such as Java, Smalltalk, C++, and also include conventional procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass an Internet connection).

The flowcharts and block diagrams in the accompanying drawings illustrate the possible implementation architecture, functions, and operations of the system, method, and computer program product according to various embodiments of the present disclosure. In this regard, each block in the flowcharts or block diagrams may represent a module, a program segment, or part of codes, and the module, program segment, or part of codes includes one or more executable instructions for realizing the specified logic function. It should also be noted that in some alternative implementations, the function marked in the block may also occur in a different sequence from the sequence marked in the drawings. For example, two blocks shown in connection can actually be executed substantially in parallel, and they can sometimes be executed in a reverse sequence, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units involved in the embodiments described in the present disclosure may be implemented in a software manner, and may also be implemented in a hardware manner. Among them, the name of the unit does not constitute a limitation on the unit itself under a certain circumstance. For example, the first determining unit can also be described as "a unit that determines the live broadcast room area to which the notification message is pushed".

The above description is only a preferred embodiment of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by the above technical features or equivalent features without departing from the above disclosed concept. For example, the above-mentioned features and the technical features disclosed in the present disclosure (but not limited to) having similar functions are replaced with each other to form a technical solution.

It should be understood that although the various steps in the flowchart of the drawings are displayed in sequence as indicated by the arrows, these steps are not necessarily performed in sequence in the order indicated by the arrows. Unless explicitly stated herein, the execution of these steps is not strictly limited in order, and they can be executed in other orders. Moreover, at least part of the steps in the flowchart of the drawings may include multiple sub-steps or multiple stages. These sub-steps or stages are not necessarily executed at the same time, but can be executed at different times, and the order of execution is not necessarily performed sequentially, but may be performed in turn or alternately with other steps, or at least a part of sub-steps or stages of other steps.

The above are only part of the embodiments of the present disclosure. It should be pointed out that for those of ordinary skill in the art, without departing from the principles of the present disclosure, several improvements and modifications can be made, and these improvements and modifications should also be regarded as the protection scope of this disclosure.

What is claimed is:

1. A message pushing method, comprising:
   when a virtual gift is received in a live broadcast room, determining a live broadcast room area to which a notification message is pushed, wherein the live broadcast room area is obtained by performing area division on live broadcast rooms, and the notification message is used to inform all live broadcast rooms in the live broadcast room area that the virtual gift is received; and
   pushing the notification message to each live broadcast room in the live broadcast room area respectively,
   wherein the determining a live broadcast room area to which a notification message is pushed, comprises at least one of the following:
   determining level information of the virtual gift, and determining the live broadcast room area to which the notification message is pushed based on the level information of the virtual gift;
   determining a live broadcast type corresponding to the live broadcast room, and determining the live broadcast room area to which the notification message is pushed based on the live broadcast type corresponding to the live broadcast room;
   determining level information corresponding to a user giving the virtual gift, and determining the live broadcast room area to which the notification message is pushed based on the level information corresponding to the user giving the virtual gift;
   determining preference information corresponding to a user giving the virtual gift, and determining the live broadcast room area to which the notification message is pushed based on the preference information corresponding to the user giving the virtual gift, wherein the preference information corresponding to the user giving the virtual gift is used to represent live broadcast room information preferred by the user giving the virtual gift; and
   determining the live broadcast room area to which the notification message is pushed based on the virtual gift and a corresponding relation between a virtual gift and a respective live broadcast room area to which a notification message is pushed.

2. The method according to claim 1, wherein the determining the live broadcast room area to which the notification message is pushed based on the level information of the virtual gift, comprises:
   acquiring a first preset relationship, wherein the first preset relationship is a corresponding relationship between a virtual gift and a respective live broadcast room area to which a notification message is pushed; and determining the live broadcast room area to which the notification message is pushed based on the level information of the virtual gift and the first preset relationship;

or the determining the live broadcast room area to which the notification message is pushed based on the live broadcast type corresponding to the live broadcast room, comprises:

acquiring a second preset relationship, wherein the second preset relationship is a corresponding relationship between a live broadcast type and a respective live broadcast room area to which a notification message is pushed; and determining the live broadcast room area to which the notification message is pushed based on the live broadcast type corresponding to the live broadcast room and the second preset relationship;

or the determining the live broadcast room area to which the notification message is pushed based on the level information corresponding to the user giving the virtual gift, comprises:

acquiring a third preset relationship, wherein the third preset relationship is a corresponding relationship between user level information and a respective live broadcast room area to which a notification message is pushed; and determining the live broadcast room area to which the notification message is pushed based on the level information corresponding to the user giving the virtual gift and the third preset relationship.

3. The method according to claim 1, wherein the step of determining preference information corresponding to a user giving the virtual gift, comprises:

acquiring historical operation information of the user giving the virtual gift on a live broadcast platform based on user authorization; and determining a live broadcast room preferred by the user giving the virtual gift and/or a live broadcast room type preferred by the user giving the virtual gift as the preference information corresponding to the user giving the virtual gift based on acquired historical operation information.

4. The method according to claim 3, wherein the historical operation information of the user giving the virtual gift on the live broadcast platform comprises at least one of the following:

a number of clicks to enter each live broadcast room, time duration to watch a live broadcast in each live broadcast room, a number of comment information posted in each live broadcast room, and likes respectively corresponding to each live broadcast room.

5. The method according to claim 1, wherein if a plurality of virtual gifts given by at least one user are received within a preset duration in the live broadcast room, and at least two virtual gifts corresponding to a same live broadcast room area to which a notification message is pushed, notification messages respectively corresponding to the at least two virtual gifts are pushed to each live broadcast room in the live broadcast room area respectively.

6. The method according to claim 5, wherein the method further comprises:

determining a notification message corresponding to each virtual gift of the at least two virtual gifts respectively, combining the notification messages corresponding to each virtual gift respectively, and pushing a combined notification message to each live broadcast room in the live broadcast room area respectively.

7. The method according to claim 6, wherein the combined notification message comprises at least one of the following:

user information corresponding to users giving each virtual gift respectively; and identification information respectively corresponding to each virtual gift;

wherein the identification information respectively corresponding to each virtual gift comprises one of the following: information of the same user giving a plurality of different virtual gifts; information of a plurality of different users giving the same virtual gift respectively; and information of a plurality of different users giving a plurality of different virtual gifts respectively.

8. The method according to claim 5, wherein the method further comprises:

determining an order of pushing the notification message based on at least one of the following:

level information corresponding to each virtual gift of the at least two virtual gifts respectively;

user level information of each user giving the at least two virtual gifts respectively; and receiving time for receiving each virtual gift of the at least two virtual gifts.

9. The method according to claim 1, wherein the notification message comprises at least one of the following:

information of a host receiving the virtual gift;

information of the virtual gift received;

information of the live broadcast room receiving the virtual gift; and information of a user giving the virtual gift.

10. A message pushing apparatus, comprising:

at least one processor; and a memory communicatively connected to the at least one processor; wherein, the memory stores instructions executable by the at least one processor, and the instructions are executed by the at least one processor, so that the at least one processor is configured to:

when a virtual gift is received in a live broadcast room, determine a live broadcast room area to which a notification message is pushed, wherein the live broadcast room area is obtained by performing area division on live broadcast rooms, and the notification message is used to inform all live broadcast rooms in the live broadcast room area that the virtual gift is received; and push the notification message to each live broadcast room in the live broadcast room area respectively, wherein when a plurality of virtual gifts given by at least one user are received within a preset duration in the live broadcast room, and at least two virtual gifts corresponding to a same live broadcast room area to which a notification message is pushed, the at least one processor is specifically configured to perform at least one of following operations:

pushing notification messages respectively corresponding to the at least two virtual gifts to each live broadcast room in the live broadcast room area respectively; and determining a notification message corresponding to each virtual gift of the at least two virtual gifts respectively, combining the notification messages corresponding to each virtual gift respectively, and pushing a combined notification message to each live broadcast room in the live broadcast room area respectively.

11. The apparatus according to claim 10, wherein
the at least one processor is specifically configured to perform at least one of following operations: determining level information of the virtual gift, and determining the live broadcast room area to which the notification message is pushed based on the level information of the virtual gift; and determining a live broadcast type corresponding to the live broadcast room, and determining the live broadcast room area to which the notification message is pushed based on the live broadcast type corresponding to the live broadcast room; and determining level information corresponding to a user giving the virtual gift, and determining the live broadcast room area to which the notification message is pushed based on the level information corresponding to the user giving the virtual gift; and determining preference information corresponding to a user giving the virtual gift, and determining the live broadcast room area to which the notification message is pushed based on the preference information corresponding to the user giving the virtual gift, wherein the preference information corresponding to the user giving the virtual gift is used to represent live broadcast room information preferred by the user giving the virtual gift; and determining the live broadcast room area to which the notification message is pushed based on the virtual gift and a corresponding relation between a virtual gift and a respective live broadcast room area to which a notification message is pushed.

12. The apparatus according to claim 11, wherein the at least one processor is further configured to:
acquire a first preset relationship, wherein the first preset relationship is a corresponding relationship between a virtual gift and a respective live broadcast room area to which a notification message is pushed;
determine the live broadcast room area to which the notification message is pushed based on the level information of the virtual gift and the first preset relationship;
or the at least one processor is further configured to:
acquire a second preset relationship, wherein the second preset relationship is a corresponding relationship between a live broadcast type and a respective live broadcast room area to which a notification message is pushed;
determine the live broadcast room area to which the notification message is pushed based on the live broadcast type corresponding to the live broadcast room and the second preset relationship;
or the at least one processor is further configured to:
acquire a third preset relationship, wherein the third preset relationship is a corresponding relationship between user level information and a respective live broadcast room area to which a notification message is pushed;
determine the live broadcast room area to which the notification message is pushed based on the level information corresponding to the user giving the virtual gift and the third preset relationship.

13. The apparatus according to claim 11, wherein the at least one processor is further configured to:
acquire historical operation information of the user giving the virtual gift on a live broadcast platform based on user authorization;
determine a live broadcast room preferred by the user giving the virtual gift and/or a live broadcast room type preferred by the user giving the virtual gift as the preference information corresponding to the user giving the virtual gift, based on acquired historical operation information.

14. The apparatus according to claim 13, wherein the historical operation information of the user giving the virtual gift on the live broadcast platform comprises at least one of the following:
a number of clicks to enter each live broadcast room, time duration to watch a live broadcast in each live broadcast room, a number of comment information posted in each live broadcast room, and likes respectively corresponding to each live broadcast room.

15. The apparatus according to claim 10, wherein the combined notification message comprises at least one of the following:
user information corresponding to users giving each virtual gift respectively; and
identification information respectively corresponding to each virtual gift;
wherein the identification information respectively corresponding to each virtual gift comprises one of the following: information of the same user giving a plurality of different virtual gifts; information of a plurality of different users giving the same virtual gift respectively; and information of a plurality of different users giving a plurality of different virtual gifts respectively.

16. The apparatus according to claim 10, wherein the at least one processor is further configured to:
determine an order of pushing the notification message respectively corresponding to the at least two virtual gifts based on at least one of the following:
level information corresponding to each virtual gift of the at least two virtual gifts respectively;
user level information of each user giving the at least two virtual gifts respectively; and
receiving time for receiving each virtual gift of the at least two virtual gifts.

17. The apparatus according to claim 10, wherein the notification message comprises at least one of the following:
information of a host receiving the virtual gift;
information of the virtual gift received;
information of the live broadcast room receiving the virtual gift; and
information of a user giving the virtual gift.

18. A non-transitory computer-readable storage medium, wherein the storage medium has at least one instruction, at least one program, a code set or an instruction set stored thereon, and the at least one instruction, the at least one program, the code set or the instruction set are loaded and executed by a processor to implement the message pushing method according to claim 1.

* * * * *